May 19, 1964 A. H. WEIERTZ 3,133,744
AUTOMOBILE STABILIZER WITH SERVO STEERING ACTION
Filed Nov. 13, 1962 2 Sheets-Sheet 1

Inventor
Axel H. Weiertz
By Wenderoth, Lind & Ponack
Attorneys

May 19, 1964   A. H. WEIERTZ   3,133,744
AUTOMOBILE STABILIZER WITH SERVO STEERING ACTION
Filed Nov. 13, 1962   2 Sheets-Sheet 2

Inventor
Axel H. Weiertz
By Wenderoth, Lind & Ponack
Attorneys

United States Patent Office 3,133,744
Patented May 19, 1964

3,133,744
AUTOMOBILE STABILIZER WITH SERVO
STEERING ACTION
Axel Hugo Weiertz, Bellevuevagen 24, Malmo V, Sweden
Filed Nov. 13, 1962, Ser. No. 236,811
Claims priority, application Sweden Nov. 11, 1961
9 Claims. (Cl. 280—96.2)

This invention relates to a stabilizer for automobiles having a pair of steerable wheels. The stabilizer according to the invention is of the type including between each wheel support and the automobile frame structure fluid pressure operated lifting means for producing a lifting force on said frame with the wheel support serving as an abutment, and a valve mechanism for controlling the fluid pressure individually in said lifting means.

In previously known stabilizers of this type the valve mechanism is adapted for operation in dependence on the turning of the automobile, for instance by the centrifugal force, or in dependence on the steering movement of a conventional mechanical steering mechanism in order to be brought into play and cause the automobile when making a turn to incline toward the side to which the steering is effected, in order that the automobile may take a more secure position on the roadway when travelling through the curve. So designed the stabilizer, however, unavoidably operates with a certain lag inasmuch as the inclination of the automobile is not realized until it has already entered the curve, which is entirely naturally since the inclining movement was initiated directly or indirectly from the steering mechanism. This of course is not satisfactory and apparently such stabilizers could not therefore assert themselves in practical use.

The invention has for its object to eliminate this drawback but also aims at exploiting the stabilizer for steering the automobile. According to the invention, the stabilizer of the type mentioned in the introduction and having a servo steering action is characterized by the fact that the point of application of each lifting means on the associated wheel support is disposed on an arm directed rearwardly from the steering knuckle, and that the valve mechanism is operable by independently adjustable control means.

For better elucidation, these features of the invention and the advantages thereof will be described more in detail in the following, reference being had to the accompanying drawings in which.

Figure 1:
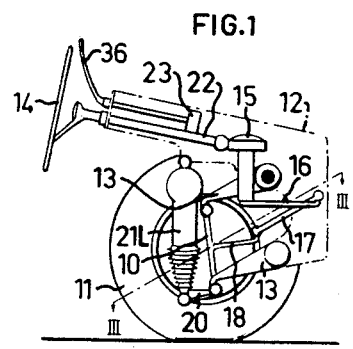
FIG. 1 is a schematic side elevational view of the steering mechanism and one individually hung steerable front wheel of an automobile, as seen from a central longitudinal vertical plane through the automobile.
Figure 2:
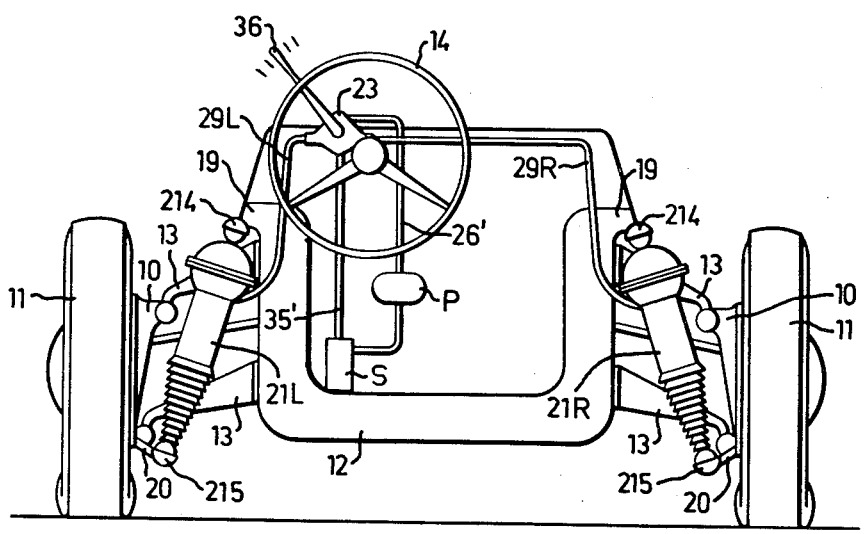
FIG. 2 is a view of the mechanism in FIG. 1, as seen from the driver's seat.
Figure 3:
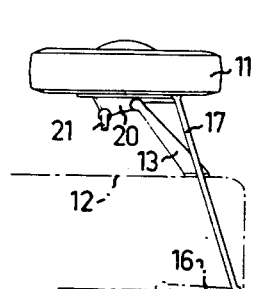
FIG. 3 is a plan view of one half of the mechanism in FIG. 1, certain components having been omitted.
Figure 4:
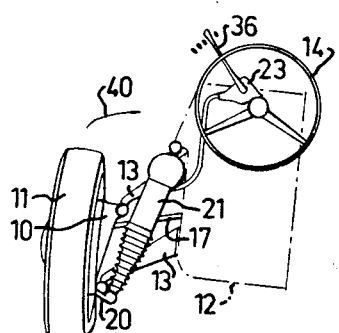
Figure 5:
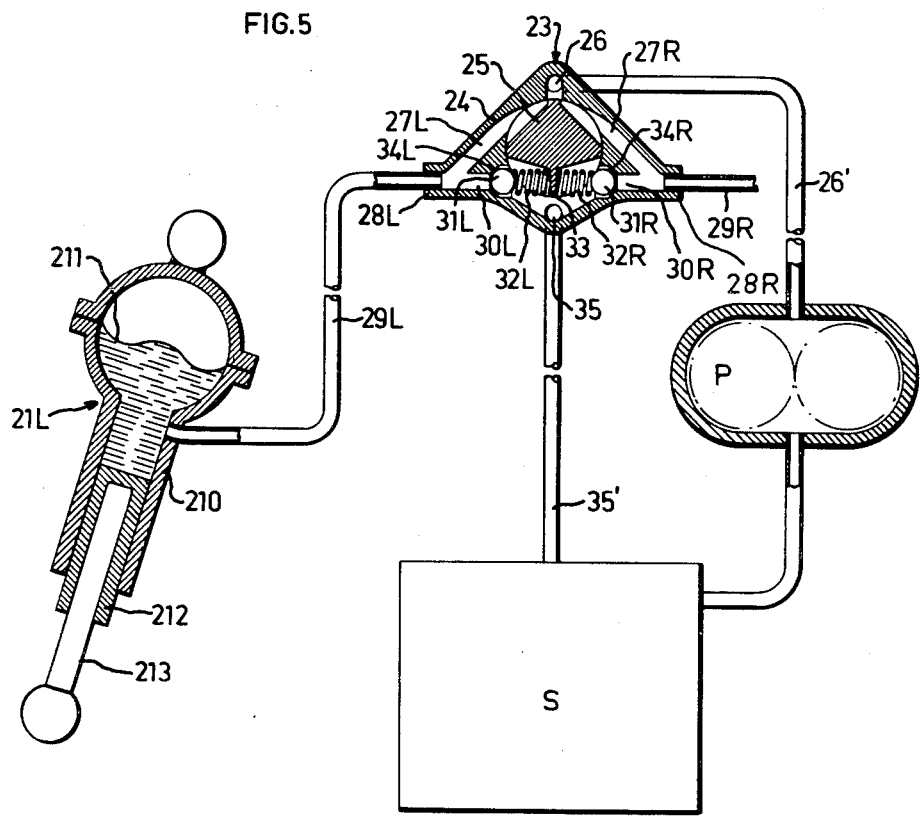
Figure 6:
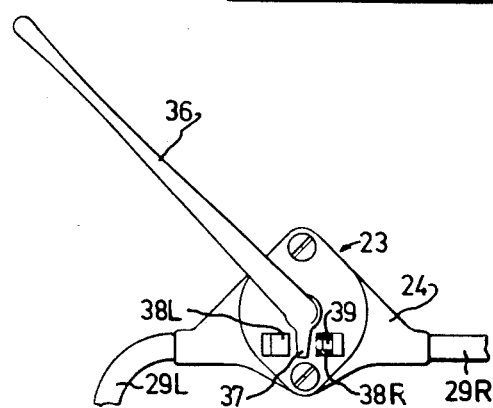

FIG. 4 similar to FIG. 2 is a half view, in which, however, the lifting means is actuated during the passage through a curve;

FIG. 5 is a sectional view of the valve mechanism and the elements associated therewith;

FIG. 6 is a front view of the valve mechanism and its control means.

The automobile on each side has a steering knuckle 10 with a wheel 11 thereon, which is connected to the chassis frame 12 of the automobile by means of e.g. torsion-spring mounted upper and lower links 13. The automobile wheels are steerable by means of a conventional mechanical steering mechanism which includes a steering wheel 14, a steering gear 15, a steering arm 16, a steering link 17 and a steering link arm 18.

Arranged in accordance with the invention between a stationary abutment 19 and a rearwardly and somewhat inwardly directed arm 20 on the steering knuckle 10 is a lifting means such as a lifting ram or jack, 21L on the left-hand side of the automobile and 21R on its right-hand side. This lifting means may be either pneumatic or hydropneumatic; in the present instance it is shown to be of the latter design. The lifting means comprises a hydraulic cylinder 210 with a diaphragm 211 which separates an air cushion from the fluid chamber. The hydraulic cylinder has a piston 212 with a piston rod 213. The cylinder and the piston rod are connected with the abutment 19 and the arm 20, respectively, by universal joints 214 and 215, respectively.

For controlling the pressure conditions in the lifting means a valve 23 of the nature shown more in detail in FIGS. 5 and 6 is disposed on the steering rod 22. This valve comprises a body 24 and a valve member 25 rotatable therein. An inlet port 26 opens into said body and is connected by a conduit 26' with a pump P driven for instance by the automobile engine and sucking oil from an oil sump S. A check valve overflow connection may be provided from the delivery side of pump P to sump S to limit the maximum oil pressure in the oil system. On both sides of said inlet port there are arranged two passages 27L and 27R each communicating with one outlet 28L and 28R, respectively, the outlet 28L being connected by a conduit 29L with the lifting means 21L arranged on the left-hand side of the automobile. The outlet 28R is connected in a corresponding manner with the lifting means 21R arranged on the right-hand side of the automobile, through a conduit 29R. Communicating with the outlet 28L and 28R, respectively, is also a passage 30L and 30R, respectively, which is controlled by a check valve comprising a ball 31L and 31R, respectively, which is biased by a pressure spring 32L and 32R, respectively, interposed between the respective ball and a projection 33 on the valve member 25 and maintaining the ball pressed against a seat 34L and 34R, respectively. Arranged between the two passages 30L and 30R is an outlet port 35 which is in communication with the oil sump S through a conduit 35'.

As will appear from the drawing, the valve member 25 is substantially triangular and in normal position, shown in FIG. 5, has one corner directed toward the inlet port 26 so that said port communicates through narrow gaps with both outlets 28L and 28R. Oil under pressure supplied through the inlet port 26 flows back to the oil sump via the check valves 31L and 31R through the outlet port 35, and the two lifting means thus both are under the same pressure. When the valve member 25 is rotated for instance clockwise as viewed in FIG. 5 the connection of the inlet port 26 with the outlet 28R is closed and the connection of said inlet port with the outlet 28L is further opened; when the valve member is rotated in the opposite direction, the reverse will take place, as is readily seen. Simultaneously with the opening of the connection between the inlet port 26 and one of the outlets, the corresponding pressure spring 32L and 32R, respectively, is further compressed so that a greater force is necessary to lift the respective ball 31L and 31R, respectively, from its seat 34L and 34R, respectively. This will increase the pressure in the lifting means connected to the corresponding outlet since the oil under pressure supplied to this lifting means has to reach a higher pressure to be able to flow back to the sump through the outlet port 35 via the corresponding check valve. This lifting means thereby lifts the automobile which inclines toward the other side.

A lever 36 is provided for the actuation of the valve member 25. It is disposed in proximity to the steering wheel 14 in order to be readily accessible. This lever can be adjusted in opposite directions from an intermediate position corresponding to the normal position of the valve member 25, shown in FIG. 5. The swinging movement of the lever 36 in each direction is limited by a projection 37 formed on said lever and adapted for cooperation with a pair of abutments 38L and 38R on the valve body. These abutments, however, are resilient and constituted by a pair of rubber bushings mounted on pins— only the pin for the rubber bushing 38R is shown and designated 39—so that the lever 36, after the projection 37 has been engaged with either of the abutments 38L or 38R can be swung further under compression of the respective abutment in order finally to bear against the pin which definitely stops the swinging movement of the lever. For this latter part of the swinging movement of the lever there is, however, required a greater force than for the first portion, since the resistance of the abutment 38L or 38R has to be overcome (the abutment forms a so-called hold-on).

It is assumed that the vehicle is to be driven through a right-hand curve as viewed in FIGS. 2 and 4. Immediately before the turn is begun the driver actuates the lever 36 clockwise, that is in the same direction toward which the turn is to be effected, to increase the pressure in the lifting means 21L at the left-hand automobile wheel 11, the lever 36 being not, however, moved farther than into engagement with the abutment 38L. Under the influence of the pressure increase in the lifting means 21L the chassis frame and thus the chassis of the automobile are thus inclined toward the right as viewed in FIG. 4 and simultaneously a torque is effected on the steering knuckle 10 which tends to swing the automobile wheels in the intended steering direction, marked by the arrow 40 in FIG. 4. This will back up the steering force exerted over the conventional mechanical steering mechanism so that the automobile can be steered more easily through the curve without the driver therefore losing the road feel necessary for a safe driving, since he always has contact with the roadway in the ordinary manner, through the conventional mechanical steering mechanism. The greater deflection the wheels are to be given, that is the narrower the curve, the greater force is necessary to turn the wheels, and this greater force is obtained automatically also in that a narrower curve requires a more pronounced inclination of the automobile and thereby a higher pressure in the lifting means. The transverse distance between ball joints 214 must be less than the transverse distance between ball joints 215 (in general this is the case on account of the king-pin inclination) to obtain automatically the greater force that is necessary to turn the wheels the narrower the curve is. This depends on the fact that the inclination of the power cylinder will change with the deflection of the wheels to a position including a greater angle with the vertical. Thus, the force applied by the power cylinder will have a greater horizontal component for a greater wheel deflection than for a smaller one. By the pressure of the lifting means against the steering knuckle the otherwise unavoidable yield in the conventional mechanical steering mechanism is equalized so that the steering becomes safer, to which also contributes the fact that the lifting means counteracts a turning movement of the wheel caused by a shock acting on the wheel from an irregularity in the road. The steering action exerted via the lifting means may be compared to a certain extent with the one exerted by the driver of a motorcycle when leaning his body weight toward one or the other side.

In parking maneouvres it may be desirable rapidly to turn the steerable automobile wheels, and this may be effected by the use of the lifting means 21 in that the latter is exposed to the highest possible pressure which is provided by moving the lever 36 against the action of the abutment 38L or 38R into its extreme end position in application against the corresponding pin and by allowing the steering wheel 14 to turn freely while the wheels are turned by the action of the force exerted. It should be pointed out here that exceeding the end position defined by either of the abutments 38L and 38R does not imply any risk of disastrous consequences, if it should be done at speeds over e.g. 20 kilometres per hour, since the centrifugal force acting on the wheels prevents the wheels being abruptly turned all over in one or the other direction.

The stabilizer according to the invention is advantageous also in that it is able to stabilize the automobile against gusts of wind acting on the automobile body.

It is possible to build the actuating means of the valve member 25 into the driver's seat so that the valve can be adjusted by the driver weighting down one or the other side of the seat, an embodiment which will be of special interest in sports cars. Modifications are thus conceivable within the scope of the appended claims.

The term "frame structure" used in the appended claims is meant to include a separate chassis frame as well as a frame structure connected to a body or provided by a self-supporting body.

What I claim and desire to secure by Letters Patent is:

1. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, valve means for controlling the fluid pressure individually in said lifting means, and independently adjustable control means for said valve means.

2. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively restricting the relief of pressure fluid from each of said lifting means through the outlet thereof to control the fluid pressure individually in said lifting means, and independently adjustable control means for said valve means.

3. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively restricting the relief of pressure fluid from each of said lifting means through the outlet thereof to control the fluid pressure individually in said lifting means, said valve means comprising a check valve member for each outlet and spring means biasing said check valve members to closed position opposite the direction of flow of pressure fluid through the respective outlets, and independently adjustable means to control said biasing force.

4. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively restricting the relief of pressure fluid from each of said lifting means through the outlet thereof to control the fluid pressure individually in said lifting means, said valve means comprising a check valve member for each outlet, adjustable abutment means and spring means between each of said check valve members and said abutment means, biasing said check valve members to closed postion opposite the direction of flow of pressure fluid through the respective outlets, and independently adjustable means controlling the position of said adjustable abutment means to control the biasing force of said spring means.

5. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively restricting the relief of pressure fluid from each of said lifting means through the outlet thereof to control the fluid pressure individually in said lifting means, said valve means comprising a check valve member for each outlet, adjustable abutment means and spring means between each of said check valve members and said abutment means, biasing said check valve members to closed position opposite the direction of flow of pressure fluid through the respective outlets, independently adjustable means controlling the position of said adjustable abutment means to control the biasing force of said spring means, and means providing a hold-on for increasing the biasing force of said spring means by said independently adjustable control means.

6. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively restricting the relief of presure fluid from each of said lifting means through the outlet thereof to control the fluid pressure individually in said lifting means, said valve means comprising a check valve member for each outlet, adjustable abutment means and spring means between each of said check valve members and said abutment means biasing said check valve members to closed position opposite the direction of flow of pressure fluid through the respective outlets, independently adjustable control means controlling the position of said adjustable abutment means to control the biasing force of said spring means, and resilient means yieldingly resisting the adjustment of said adjustable abutment means to provide a hold-on for increasing the biasing force of said spring means by said independently adjustable control means.

7. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively controlling the admittance of pressure fluid to each of said lifting means from said source and selectively restricting the relief of pressure fluid from each of said lifting means through the outlet thereof to control the fluid pressure individually in said lifting means, and independently adjustable control means for said valve means.

8. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming one outlet for pressure fluid from each of said lifting means, valve means selectively controlling the admittance of pressure fluid to each of said lifting means from said source and selectively restricting the relief of pressure fluid from each of said lifting means through the outlet thereof to control the fluid pressure individually in said lifting means, said valve means comprising an adjustable valve member controlling the flow of pressure fluid through said connecting means to said lifting means, a check valve member for each outlet, abutment means on said valve member, and spring means between each of said check valve members and said abutments means, biasing said check valve members to closed position opposite the direction of flow of pressure fluid through the respective outlets, said abutment means being arranged on said adjustable valve member to be displaced in direction to increase the biasing force of one of said check valve members when said adjustable valve member is adjusted to increase the flow of pressure fluid through said connecting means to the lifting means controlled by said one check valve member, and independently adjustable means controlling the position of said adjustable valve member.

9. In an automobile having a frame structure, a pair of steerable wheels and a wheel support on said frame structure for each of said wheels, each of said wheel supports including a steering knuckle, the combination of an arm on each steering knuckle directed rearwardly therefrom, a fluid pressure operated lifting means between said frame structure and each of said arms for producing a lifting force on said frame structure with said wheel support serving as an abutment, a fluid pressure source, means connecting said lifting means to said source, means forming an outlet for pressure fluid from each of said lifting means, valve means selectively controlling the admittance of pressure fluid to each of said lifting means from said source and selectively restricting the relief of pressure fluid from each of said lifting means through the outlet thereof to control the fluid pressure individually in said lifting means, said valve means comprising an adjustable valve member controlling the flow of pressure fluid through said connecting means to said lifting means, a check valve member for each of said outlets, abutment means on said valve member, and spring means between each of said check valve members and said abutment means, biasing said check valve members to closed position opposite the direction of flow of pressure fluid through the respective outlets, said abutment means being arranged on said adjustable valve member to be displaced in direction to increase the biasing force of one of said check valve members when said adjustable valve member is adjusted to increase the flow of pressure fluid through said connecting means to the lifting means controlled by said one check valve member, independently adjustable means controlling the position of said adjustable valve member and resilient means yieldingly resisting the adjustment of said adjustable valve member to provide a hold-on for increasing the biasing force of said spring means by said independently adjustable control means.

References Cited in the file of this patent
UNITED STATES PATENTS

| | | |
|---|---|---|
| 2,110,809 | Murphy | Mar. 8, 1938 |
| 2,743,941 | Walker | May 1, 1956 |
| 2,805,080 | Perez | Sept. 3, 1957 |
| 3,037,787 | Gottschald | June 5, 1962 |